(12) United States Patent
Marinkovich et al.

(10) Patent No.: US 8,375,312 B2
(45) Date of Patent: Feb. 12, 2013

(54) CLASSIFYING DIGITAL MEDIA BASED ON CONTENT

(75) Inventors: Mike Marinkovich, Santa Clara, CA (US); Greg Lindley, Sunnyvale, CA (US); Alan Cannistraro, San Francisco, CA (US); Evan Doll, San Francisco, CA (US); Gary Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1228 days.

(21) Appl. No.: 11/760,720

(22) Filed: Jun. 8, 2007

(65) Prior Publication Data

US 2008/0307337 A1    Dec. 11, 2008

(51) Int. Cl.
*G06F 3/00* (2006.01)
*G06F 3/048* (2006.01)

(52) U.S. Cl. ........ 715/762; 715/764; 715/804; 715/833; 715/846; 715/848; 715/768

(58) Field of Classification Search .................. 715/762, 715/764, 804, 833, 846, 848
See application file for complete search history.

(56) References Cited

U.S. PATENT DOCUMENTS

| | | | | |
|---|---|---|---|---|
| 5,671,381 A * | 9/1997 | Strasnick et al. | ............. | 715/848 |
| 5,694,176 A * | 12/1997 | Bruette et al. | ................... | 725/43 |
| 5,835,094 A * | 11/1998 | Ermel et al. | .................... | 715/848 |
| 6,028,603 A * | 2/2000 | Wang et al. | .................... | 715/776 |
| 6,160,554 A * | 12/2000 | Krause | ........................... | 715/804 |
| 6,208,344 B1 * | 3/2001 | Holzman et al. | ............... | 715/846 |
| 6,253,218 B1 * | 6/2001 | Aoki et al. | ...................... | 715/201 |
| 6,326,988 B1 * | 12/2001 | Gould et al. | .................. | 715/850 |
| 6,335,742 B1 * | 1/2002 | Takemoto | ...................... | 715/781 |
| 6,366,299 B1 * | 4/2002 | Lanning et al. | ................ | 715/738 |
| 6,411,724 B1 * | 6/2002 | Vaithilingam et al. | ......... | 382/100 |
| 6,629,104 B1 * | 9/2003 | Parulski et al. | ........................ | 1/1 |
| 6,795,094 B1 * | 9/2004 | Watanabe et al. | .............. | 715/762 |
| 6,798,412 B2 * | 9/2004 | Cowperthwaite | ............. | 345/428 |
| 6,948,123 B2 * | 9/2005 | Endou et al. | ................... | 715/700 |
| 6,948,124 B2 * | 9/2005 | Combs et al. | ................... | 715/712 |
| 7,032,182 B2 * | 4/2006 | Prabhu et al. | .................. | 715/805 |
| 7,117,453 B2 * | 10/2006 | Drucker et al. | ................ | 715/833 |
| 7,162,488 B2 * | 1/2007 | DeVorchik et al. | .................... | 1/1 |
| 7,296,242 B2 * | 11/2007 | Agata et al. | ..................... | 715/793 |
| 7,340,678 B2 * | 3/2008 | Chiu et al. | ....................... | 715/734 |
| 7,353,234 B2 * | 4/2008 | Kimball et al. | ........................ | 1/1 |
| 7,370,065 B1 * | 5/2008 | Rys | ....................................... | 1/1 |
| 7,383,503 B2 * | 6/2008 | Banks | ........................... | 715/273 |
| 7,486,807 B2 * | 2/2009 | Nagahashi | ..................... | 382/118 |
| 7,512,586 B2 * | 3/2009 | Kaasten et al. | ........................ | 1/1 |
| 7,542,994 B2 * | 6/2009 | Anderson | .............................. | 1/1 |
| 7,548,936 B2 * | 6/2009 | Liu et al. | ................................ | 1/1 |
| 7,564,377 B2 * | 7/2009 | Kimchi et al. | ............ | 340/995.13 |
| 7,583,265 B2 * | 9/2009 | Shiraishi et al. | ............... | 345/427 |
| 7,587,680 B2 * | 9/2009 | Wada | ............................. | 715/804 |
| 7,600,243 B2 * | 10/2009 | Brain et al. | ..................... | 725/44 |
| 7,657,845 B2 * | 2/2010 | Drucker et al. | ............... | 715/833 |

(Continued)

*Primary Examiner* — Steven B Theriault

(74) *Attorney, Agent, or Firm* — Schwegman Lundberg & Woessner, P.A.

(57) ABSTRACT

A computer-implemented method for classifying digital content can include displaying one or more poster frames in a user interface, wherein a poster frame corresponds to an item of digital content, displaying one or more first level classification panes adjacent to a poster frame corresponding to an item to be classified, wherein a first level classification pane is associated with a keyword, and enabling a user to associate a poster frame with a first level classification pane to cause the keyword associated with the first level classification pane to be associated with the item to which the poster frame corresponds.

22 Claims, 4 Drawing Sheets

U.S. PATENT DOCUMENTS

| | | | |
|---|---|---|---|
| 7,672,950 B2* | 3/2010 | Eckardt et al. | 707/999.01 |
| 7,716,604 B2* | 5/2010 | Kataoka et al. | 715/835 |
| 7,769,745 B2* | 8/2010 | Naaman et al. | 707/713 |
| 2003/0126212 A1* | 7/2003 | Morris et al. | 709/205 |
| 2004/0213553 A1* | 10/2004 | Nagahashi | 386/69 |
| 2005/0192924 A1* | 9/2005 | Drucker et al. | 707/1 |
| 2005/0246331 A1* | 11/2005 | De Vorchik et al. | 707/3 |
| 2006/0069998 A1* | 3/2006 | Artman et al. | 715/721 |
| 2009/0063552 A1* | 3/2009 | Jones | 707/102 |

* cited by examiner

CLASSIFYING DIGITAL MEDIA BASED ON CONTENT

TECHNICAL FIELD

The following description relates to classifying items of digital content, e.g., video, audio, images, and the like, based on content.

BACKGROUND

Scenes in motion can be captured and recorded using a variety of devices ranging from state-of-the-art professional video cameras used in television and movie-making to simple cameras on cellular telephones. Some of the devices that can be used to capture motion pictures, including digital camcorders and digital cameras, allow storing the captured images in digital format including the moving picture experts group. (MPEG) format. Depending on device capabilities and user settings, a camera can capture and store both audio and video. The recorded information is automatically stored in digital format and can be easily transported to secondary devices, including a hard disk of a computer, using various wired or wireless communications protocols such as bluetooth or universal serial bus (USB).

Video editing software, such as iMovie HD 6.0.1, enables users to view and perform non-linear editing on raw footage. Such editing may include cutting segments of the footage, re-arranging segments of the same video clip, re-arranging and combining segments of multiple video clips, and/or modifying the captured content by adding or substituting other content including audio tracks, voice-overs, titles, associating keywords to all or portions of a video clip, and transitions between frames.

SUMMARY

In one example, items of digital content in located in a storage device can be displayed in a user interface. The user can be presented with one or more repositories that represent a first level for classifying the items of digital content. When the user transfers an item of digital content to a first level repository, additional levels of classification corresponding to each first level repository can be presented to the user to further classify the item of digital content.

In one aspect, a computer-implemented method for classifying digital content is described. The method includes displaying one or more poster frames in a user interface, wherein a poster frame corresponds to an item of digital content, displaying one or more first level classification panes adjacent to a poster frame corresponding to an item to be classified, wherein a first level classification pane is associated with a keyword, and enabling a user to associate a poster frame with a first level classification pane to cause the keyword associated with the first level classification pane to be associated with the item to which the poster frame corresponds.

This, and other aspects, can include one or more of the following features. The first level classification panes can be generated based on user input. A first level classification pane can be generated for each associated keyword. The keyword can be provided by a user. The keyword can be automatically generated. The display of one or more first level classification panes adjacent to a poster frame can cause the poster frame to be highlighted and the display of the user interface to be darkened. The method can further include enabling grouping the items of digital content based on the keyword. Enabling the user to associate the poster frame with the first level classification pane can include enabling the user to perform operations including positioning a cursor on the poster frame, selecting the poster frame, and moving the poster frame to the first level classification pane. Associating the keyword with the item can include the keyword in metadata associated with the item. The method can further include displaying one or more second level classification panes adjacent to a poster frame corresponding to the item, wherein the second level classification pane is a further classification of the first level classification pane and the second level classification pane is associated with a second keyword, and enabling a user to transfer a poster frame transferred to a first level classification pane to the second level classification pane, wherein the transferring causes the second keyword associated to be associated with the item to which the poster frame corresponds. The method can further include enabling grouping the items of digital content based on the second keyword.

In another aspect, a medium bearing instructions to enable one or more machines to perform operations is described. The operations include displaying one or more poster frames in a user interface, wherein a poster frame corresponds to an item of digital content, displaying one or more first level classification panes adjacent to a poster frame corresponding to an item to be classified, wherein a first level classification pane is associated with a keyword, and enabling a user to associate a poster frame with a first level classification pane to cause the keyword associated with the first level classification pane to be associated with the item to which the poster frame corresponds.

This, and other aspects, can include one or more of the following features. The first level classification panes can be generated based on user input. A first level classification pane can be generated for each associated keyword. The keyword can be provided by a user. The keyword can be automatically generated. The display of one or more first level classification panes adjacent to a poster frame can cause the poster frame to be highlighted and the display of the user interface to be darkened. The operations can further include enabling grouping the items of digital content based on the keyword. Enabling the user to associate the poster frame with the first level classification pane can include enabling the user to perform additional operations including positioning a cursor on the poster frame, selecting the poster frame, and moving the poster frame to the first level classification pane. Associating the keyword with the item can include the keyword in metadata associated with the item. The operations can further include displaying one or more second level classification panes adjacent to a poster frame corresponding to the item, wherein the second level classification pane is a further classification of the first level classification pane and the second level classification pane is associated with a second keyword, and enabling a user to transfer a poster frame transferred to a first level classification pane to the second level classification pane, wherein the transferring causes the second keyword associated to be associated with the item to which the poster frame corresponds. The operations can further include enabling grouping the items of digital content based on the second keyword.

The systems and techniques described here can present one or more of the following advantages. Presenting all items of digital content, including raw footage, finished projects, and the like, can enable the user to instantly access any item. Arranging the items in a sequence corresponding to the time when each item was created and modified can simplify searching for the items. A first level classification of the items of digital content can allow a user to quickly sort through a large number of items and return to the sorted items for further editing. Additional levels of classification can allow a user to further sort the items. Associating a keyword with each item based on the classification can enable a user to subsequently group the items based on the keyword and edit all items that share a common keyword simultaneously. Automatic generation and assignment of keywords based on the content can enable a user to separate content, e.g., good and bad content. Providing users with a template for capturing content and subsequently providing keywords associated with the template can simplify the process of capturing and editing content for an average user.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
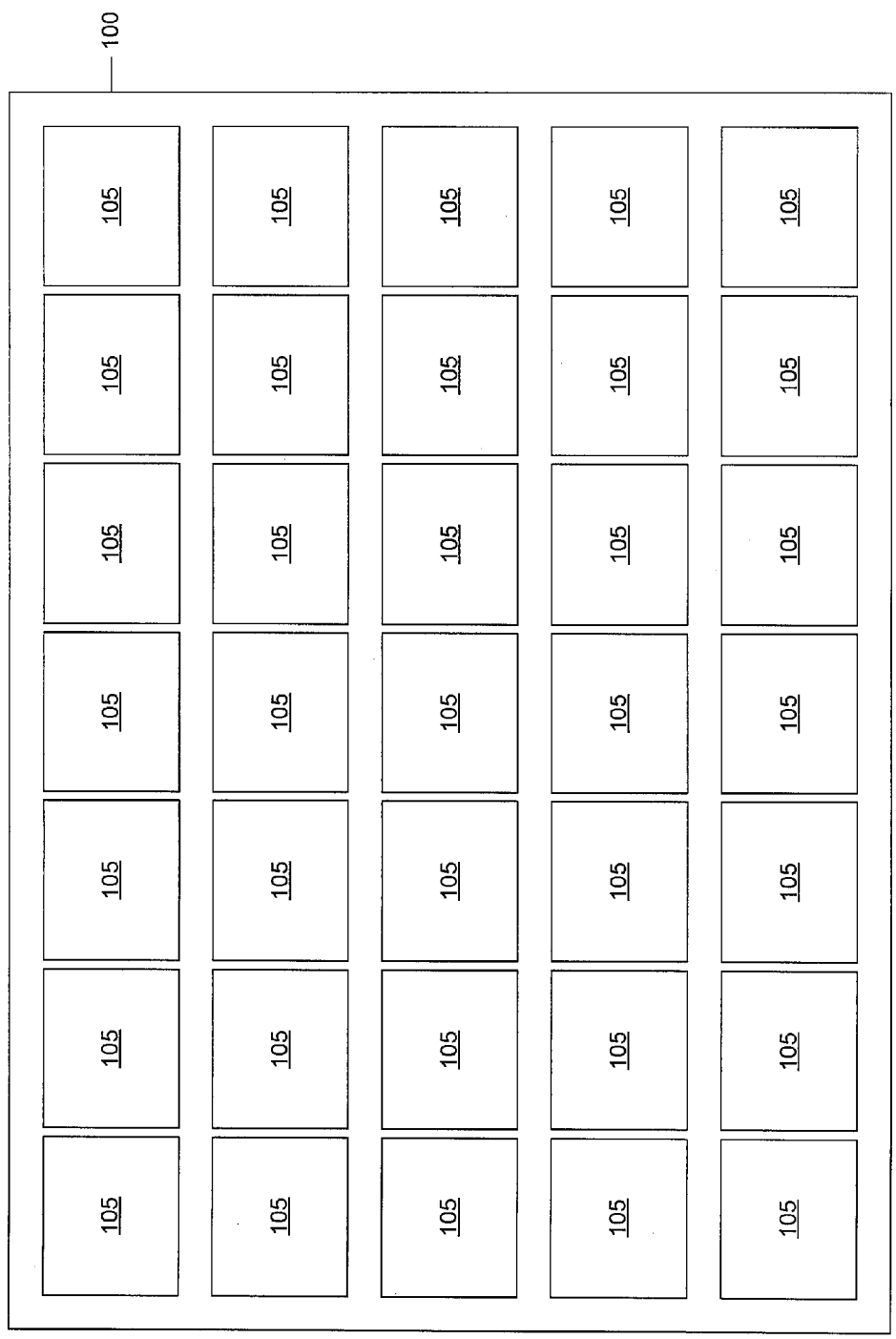
FIG. 1 is a schematic of an example of a user interface.

FIG. 1 depicts a schematic of a user interface 100 for displaying one or more items of digital content. The user interface 100 can be displayed on a display device of a system on which digital content editing software is installed. The items of digital content can include video, audio, images, and the like, stored on one or more storage devices operatively coupled to the system. A user may have captured the items of digital content using a recording instrument such as a camcorder, a digital camera, a cellular telephone, and the like. In some implementations, each item of digital content can be represented by a rectangular poster frame 105. The items can be arranged in rows where the poster frame 105 corresponding to the first item is positioned adjacent to the top left edge of the user interface 100, the poster frame 105 corresponding to the second item is positioned at a distance to the right of the first poster frame 105, and so on. When a poster frame 105 corresponding to the item is positioned adjacent to the top right edge of the user interface 100 such that no other poster frames can be positioned in the same row, a subsequent poster frame 105 can be positioned in a second row, vertically displaced from the first row. In this manner, poster frames 105 corresponding to items of digital content can be arranged in one or more rows. The position of each poster frame 105 can correspond to a time when the corresponding item of digital content was captured, so that the progression of time in the user interface 100 corresponds to the arrangement of poster frames 105 from left to right and from top to bottom.

In implementations when the item of digital content is a video file, each video file, captured using a recording instrument, is stored as sequence of frames. When an item of digital content displayed in the user interface is a video file, one of the frames in the video file can be displayed within the bounded region of the poster frame 105 representing the video file to enable identifying the file. In some implementations, the frame can be the first frame in the video file. Alternatively, the frame can be any frame in the video file that the user can assign as representative of the video file. In some implementations, the user can scrub the content of the video file, i.e., preview the contents of the video file, by scanning a cursor controlled by a pointing device, e.g., a mouse over the poster frame representing the video file. Each position of the cursor on the poster frame can correspond to a frame in the video file which the poster frame represents. Scanning the cursor from left to right displays the frames corresponding to the cursor in the bounded region of the poster frame in the sequence in which the frames were recorded. Similarly, scanning the cursor from right to left displays the frames corresponding to the cursor in the bounded region of the poster frame in the sequence opposite to that in which the frames were recorded. The user can select a frame in the video file to represent the video file by scrubbing the contents of the video file. The selected frame can be displayed in the bounded region of the poster frame 105 representing the file. When a cursor is placed on a poster frame 105, the frame corresponding to the position of the cursor can be displayed within the bounded region of the poster frame 105. Subsequently, when the cursor is removed from the poster frame 105, the poster frame 105 assigned to represent the video file can be displayed. Alternatively, the frame corresponding to the last position of the cursor on the poster frame 105 can be displayed.

Figure 2:
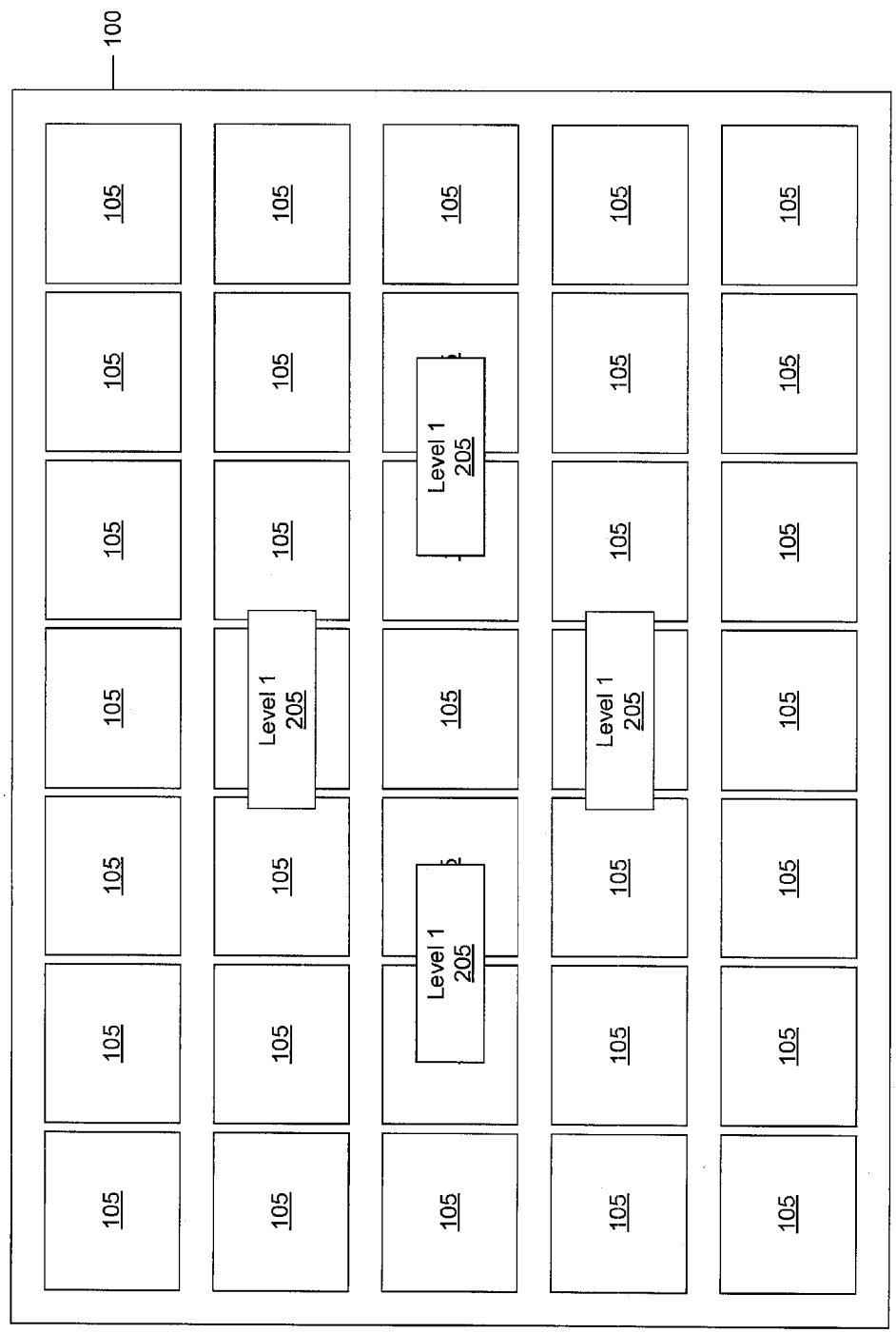
FIG. 2 is a schematic of an example of a user interface displaying a first level classification.

FIG. 2 is a schematic of a user interface 100 displaying a first level classification for storing the items of digital content. In some implementations, the user can classify an item of digital content, e.g., a video file, based on the content. For example, all the videos that a user captured can relate to a common event such as a soccer game. The user may have captured each video file at different periods during the game. Not all the captured video may be of good quality. For example, an amateur user of a video camera may have forgotten to remove the lens cap during recording. In another example, the user may not have held the camera steadily, which may result in shaking in the recorded content. The first level of classification can include separating good and bad content.

In some implementations, the user can capture video based on sections of a template, where the template relates to a story board and each section relates to an event in the story. The template can be generated by the system or by the user. For example, the template can be related to a soccer game where each section of the template represents an event that can occur frequently in a soccer game, e.g., team arrival, team warm up, passes, goals, corners, penalty shootout, and the like. The first level of classification can include identifying items of video that correspond to each event and separating the items based on the classification.

In some implementations, the user can provide input to the video editing software that the user wishes to classify the video files displayed on the user interface 100. Upon detecting user input, the display of the user interface 100 may be darkened, while the first poster frame 105 displayed adjacent to the top left edge of the user interface 100 can be highlighted. In addition, one or more first level classification (Level 1) panes 205 can be displayed adjacent to the highlighted poster frame 105. Each level 1 pane 205 can correspond to a category in the classification. For example, if the classification includes separating the video files into good and bad video files, the level 1 panes 205 can be "Good," and "Bad" panes. If the classification includes separating the video files into events based on a story board template, e.g., for a soccer game, then the level 1 panes 205 can be "Team warm up," "Passes," "Goals," "Corners," "Penalty shoot out," panes and the like.

The user can scrub the contents of the video file to by scanning the cursor across the poster frame 105 and view the frames of the video file. Based on the contents, the user can place a video file in one of the level 1 panes 205 by, e.g., selecting the poster frame 105 using the cursor, and moving the selected poster frame 105 to the desired level 1 pane 205. In response to the user moving a poster frame 105 to the desired level 1 pane 205, the corresponding video file can be associated with a keyword that is representative of the level 1 pane 205 to which it was moved. The software can be configured to include the keyword to the metadata related to the video file. In some implementations, key words can be associated by methods including manually by user input, or automatically, e.g., based on audio recognition, e.g., speech recognition, time of day, light settings, and the like. In this manner, a video file can be classified based on the content. Similarly, any item of digital content can be transferred to a level 1 classification pane 205 and associated a keyword related to the level 1 classification pane 205.

In some implementations, subsequent to the user classifying the first video file, the poster frame 105 representing the first video file can be darkened, the second poster frame 105 representing the second video file can be highlighted, and the level 1 panes can be displayed around the second poster frame 105. The user can select and move the poster frame 105 representing the second video file to one of the level 1 panes to classify the second video file. In response, the classified video file can be associated with a keyword that is representative of the level 1 classification pane 205. The user can repeat this process for all the poster frames 105, thereby classifying all the video files. In other implementations, subsequent to the first video file being classified, the second poster frame 105 can be displayed at the location of the first poster frame 105. The user can move the second poster frame 105 to one of the level 1 panes 205. For every instance where the user moves a poster frame 105 to one of the level 1 panes 205, the subsequent poster frame 105 can be moved to the location of the previous poster frame 105 in the user interface 100 to enable the user to classify the moved video file. In some implementations, the user can select one or more poster frames 105 to move only the selected poster frames 105 to level 1 panes 205. In other implementations, the first poster frame 105 that the user chooses to classify can be a poster frame 105 positioned at any location in the user interface 100.

Figure 3:
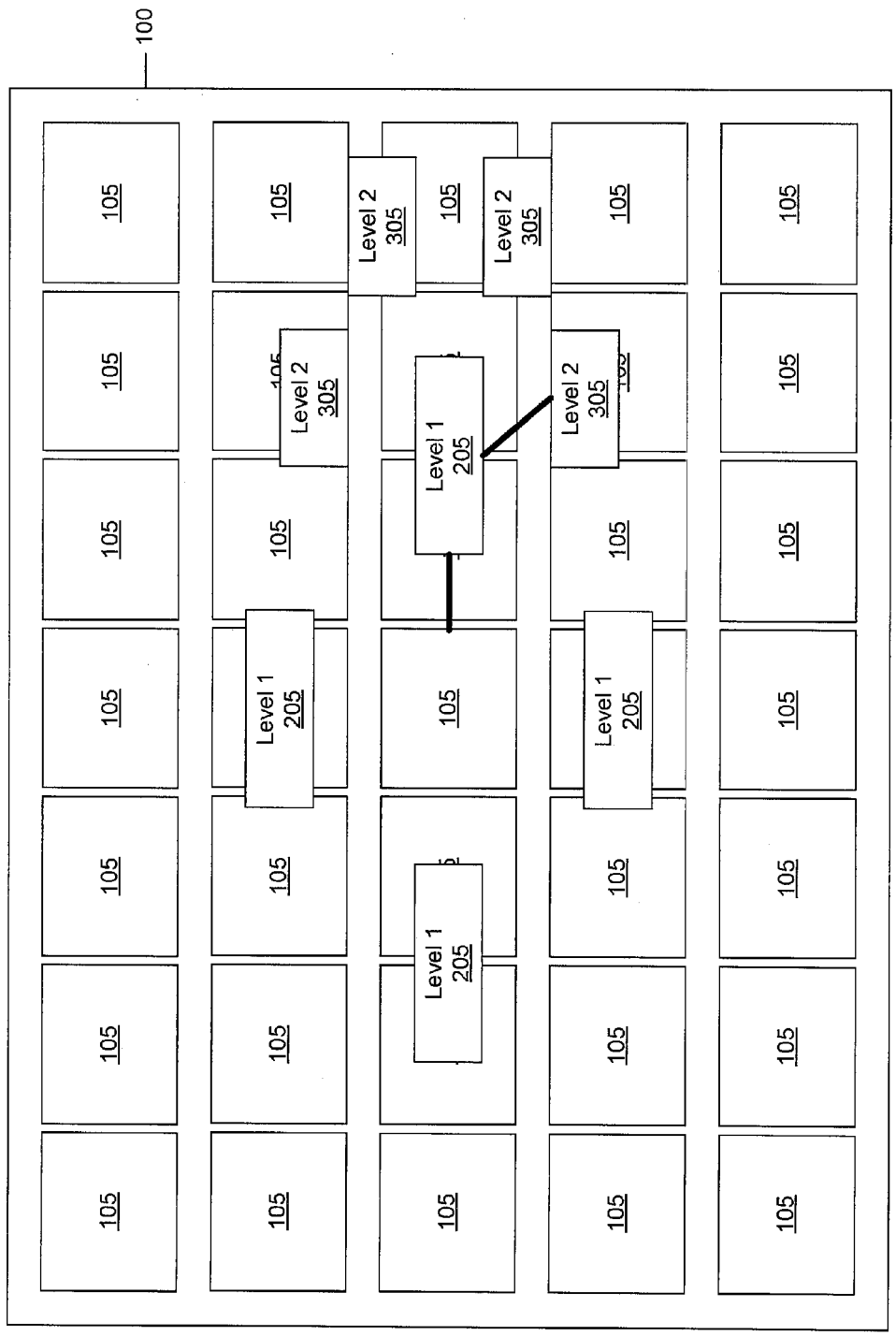
FIG. 3 is a schematic of an example of a user interface displaying a second level classification.

FIG. 3 depicts a schematic of a user interface 100 which includes level 1 classification panes 205 and level 2 classification panes 305. In some implementations, the user can use the first level classification of moving poster frames 105 into level 1 panes 205 as a method to quickly sort the items. Subsequent to the first level classification, the user can perform a second level classification, where one or more categories in the first level classification can have corresponding second level categories. In some implementations, the user can perform a first level classification to quickly associate keywords to each item of digital content. Subsequently, the user can further classify the items under each level 1 pane 205. In such implementations, when the user provides input to perform a second level classification, the poster frame 105 representing the item of digital content 105 which the user wishes to classify can be highlighted along with the level 1 pane 205 in which the item of digital content 105 has been placed. In addition, one or more level 2 panes 305 can be displayed adjacent to the level 1 pane 205, where the level 2 panes 305 are sub-categories related to the level 1 pane 205. The remaining level 1 panes 205 and the remaining portions of the user interface 100 can be darkened.

The user can position the cursor on the poster frame 105 representing the item of digital content 105 to select the item and move the item to the desired level 2 pane 305. In other implementations, the user can position the cursor on the level 1 pane 205 which can cause a frame of the item of digital content 105 to appear in the bounded region of the level 1 pane 205. Subsequently, the user can move the frame from the level 1 pane 205 and place it on the level 2 pane 305. In response to the user placing the item of digital content 105 in the level 2 pane, a line connecting the level 2 pane 305 to the level 1 pane 205 and another line connecting the level 1 pane 205 to the poster frame 105 representing the item of digital content 105 can be displayed on the user interface 100 to enable a user to identify the classification of the item 105.

In this manner, a user can follow a quick classification of items 105 by a more detailed classification. In other implementations, when the user places an item 105 in a level 1 pane 205, any level 2 panes 305 corresponding to the level 1 pane 205 can be displayed on the user interface 100. The user can further classify the item 105 by placing the item 105 in a level 2 pane 305, restrict classification to only a first level, or access the first level classifications at a subsequent time to further classify the items. In some implementations, the categories represented by the level 1 panes 105 and the level 2 panes 305 can be generated by the software providing the user interface 100. Alternatively, the categories can be generated by the user. In some implementations, the user can add categories to the first level and second level classification categories offered by the system. When a second level classification is added to an item of digital content, a second keyword can be associated with the item. The second keyword can be included in the metadata related to the item such that the item can be identified by both the first level classification keyword as well as the second level classification keyword.

Figure 4:
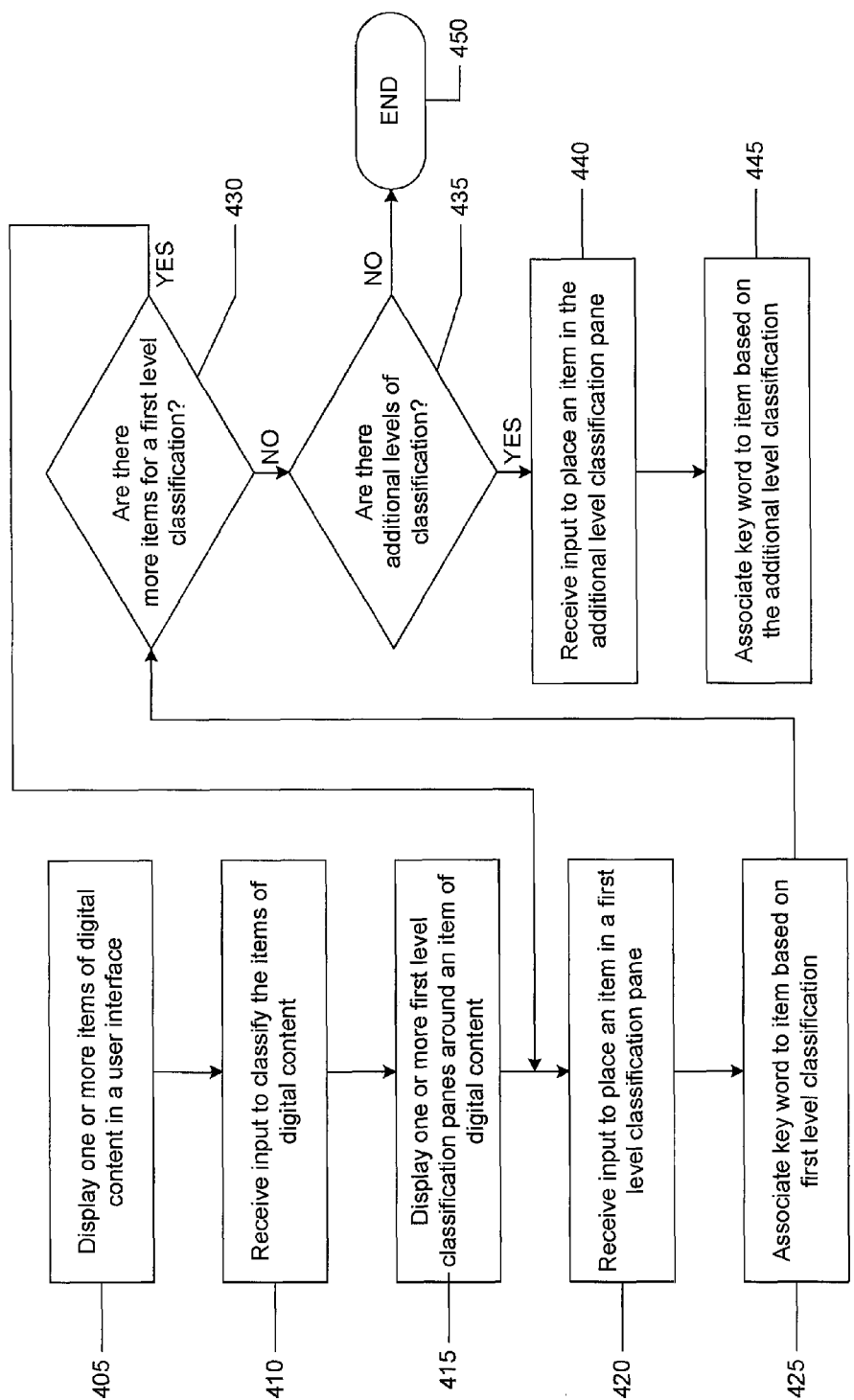
FIG. 4 is a flow chart of an example of a process for classifying items of digital content.

FIG. 4 depicts a flow chart of an example of a process for classifying items of digital content based on the content. One or more items of digital content can be displayed in a user interface at 405. The items of digital content can include virtually any digital content such as video files, audio files, images, documents, and the like, where the items include raw footage as well as projects created from the raw footage. The software presenting the interface can be configured to upload the items from one or more storage devices operatively coupled to the system on which the software is installed. In some implementations, the software can search the system for storage devices, upload the items stored on the storage devices, and display each item by a corresponding rectangular poster frame when the software is launched on the system. In other implementations, the user can select one or more items of digital content to be presented on the user interface. The items of digital content can be displayed as poster frames where the first poster frame is positioned adjacent to the top left edge within the boundary of the user interface, the second poster frame is positioned to the right of the first poster frame in a first row, the third poster frame is positioned to the right of the second poster frame in the first row, and so on. Poster frames that cannot be positioned in the first row can be positioned in a second, vertically displaced row. In this manner, the poster frames representing the items of digital content can be arranged in rows, where the position of the poster frames corresponds to a time when the item was captured. Thus, in this implementation, the progression of time can correspond to a sequence of poster frames starting from left to right and from top to bottom.

Input to classify the items of digital content can be received at 410. In some implementations, the system can be configured to upload the items of digital content into the user interface, display each item by a corresponding poster frame, and classify the items based on the content, e.g., as a video file, an audio file, an image, and the like, or by other metadata associated with each item such as the file name, file size, and the like. Alternatively, input to classify the items can be received from a user. For example, the user can select a button on the user interface configured to present the user with a panes to enable classifying the items of digital content. The user can select the button on the user interface and select a poster frame representing an item of digital content, e.g., by placing a cursor on the poster frame and clicking on the poster frame. In response to the user selecting a poster frame, one or more first level classification panes can be displayed around the selected poster frame. In some implementations, the first level classification panes can include categories offered by the software. For example, the first level classification panes can include "Good" and "Bad" panes. Alternatively, the first level classification panes can correspond to sections of a template, where the template represents a story board provided to the user to assist the user to capture content. For example, the user may wish to record a soccer game. The software can include a "Soccer game" template further including sections such as "Team warm up," "Passes," "Goals," "Corner kicks," "Penalty shootout," and the like. Each first level classification pane can represent a repository into which one or more items of digital content can be placed.

Input to classify an item of digital content by placing the poster frame corresponding to the item in a first level classification pane can be received at 420. In some implementations, the input can be received from a user, where a user can select a poster frame corresponding to an item of digital content, move the selected poster frame, and place the frame in the first level classification pane. Each first level classification pane can be associated with a keyword that can, in turn, be associated with the item of digital content placed in the first level classification pane at 425. All items placed in the same first level classification pane can be associated with a common keyword, enabling grouping the items based on the keyword. The keyword for a classification pane can be generated by the software or by the user. Alternatively, the software can be configured to generate a keyword and present the keyword to the user. The user can either accept or replace the keyword. The keyword can be included in the metadata of the item. Upon classifying an item of digital content and associating a keyword, the presence of more items of digital content for a first level classification can be checked at 430. If more items are present, then the placing the additional items in classification levels at 420 and the associating of keywords corresponding to the classification at 425 can be performed. If no more items are present, the availability of additional levels of classification can be checked at 435. In some implementations, placing an item in a first level classification pane can cause one or more second level classification panes, associated with the first level, to be displayed on the user interface to enable additional classification. A user can further classify the item by placing the item in the second level classification pane at 440. This can cause a second keyword to be associated with the item at 445. The second keyword can be included in the metadata of the item. In addition to enabling grouping based on the first level classification keyword, grouping based on keywords for each additional level of classification can also be enabled. A first level classification can enable a user to quickly categorize each item so that the user can subsequently return to the item for further classification. In other implementations, when an item is placed in a first level classification pane, second level classification panes, if any, can be displayed, enabling a user to further classify the item. Each level classification pane can represent a repository where the items can be stored. A user can upload items into the user interface based on the associated keywords, edit items under the same category, move items from one category to another, and perform virtually any editing operation to the items in a category.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, the item of digital content can be an audio, an image, or any type of digital content including documents. For example, a poster frame on the user interface can represent an album containing photographs where the user can scrub the poster frame to view each photograph. Alternatively, the poster frame can represent a document containing several pages where the user can scrub the poster frame to view each page of the document. The levels of classification can be automatically generated based on the content of the item. For example, the user interface can display a combination of items including video files, audio files, documents, images, and the like. The system can detect the type of digital content, e.g., based on a file name extension, create a first level classification including "Video," "Audio," "Documents," "Images," panes and the like, move the items to the respective pane, and associate representative keywords to the metadata related to each item. In addition, the user interface can display both raw footage including digital content captured using recording instruments as well as finished projects which included edited content that is stored.

In other implementations, the software can be configured to create first level classifications including "Good," and "Bad" panes. The software can be configured to scan the contents of the item and identify undesirable items that include poorly exposed images, completely dark video files, shaky video files, and the like, and associate keywords that indicate that the files are unsuitable for viewing. The software can be configured to present the "Bad" items to the user who can either accept or reject the classification. In some implementations, the keywords associated with the items of digital content can be used to subsequently group the items. The keyword associated to each item can be identified from the metadata of the items and used to group the items. The software can be configured to automatically group the items based on keywords in the metadata. In some implementations, the user can provide a list of keywords. Upon receiving the keywords, a classification pane can be generated for each keyword. Subsequently, the user can assign a level to each keyword which can cause the corresponding classification pane to be displayed on the user interface. In other implementations, the software can be configured to generate a classification pane for each generated keyword and display the generated classification panes on the user interface. Accordingly, other embodiments are within the scope of the following claims.

What is claimed is:

1. A computer-implemented method for classifying digital content, the method comprising:
   displaying one or more poster frames in a user interface, wherein a poster frame corresponds to an item of digital content;
   in response to receiving an input, displaying a plurality of first level classification panes adjacent to a poster frame corresponding to an item of digital content, wherein each of the first level classification panes is associated with a corresponding keyword;

detecting a selection and positioning of the poster frame at an at least partially common location with a classification pane of the plurality of first level classification panes; and in response to the detecting, associating the item of digital content to which the selected poster frame corresponds with a keyword associated with the first level classification pane on which the selected poster frame that corresponds to the item of digital content is positioned.

2. The method of claim 1 wherein the first level classification panes are generated based on user input.

3. The method of claim 2 wherein a first level classification pane is generated for each associated keyword.

4. The method of claim 3 wherein the keyword is provided by a user.

5. The method of claim 3 wherein the keyword is automatically generated.

6. The method of claim 1 further comprising when displaying the plurality of first level classification panes adjacent to the poster frame, darkening appearances of remaining poster frames of the plurality of poster frames.

7. The method of claim 1 further comprising enabling grouping the items of digital content based on the keyword.

8. The method of claim 6 further comprising, subsequent to associating the item of digital content to which the selected poster frame corresponds with the keyword associated with the first level classification pane on which the selected poster frame that corresponds to the item of digital content selected is positioned, displaying the plurality of first level classification panes adjacent to a second poster frame of the plurality of poster frames, wherein the second poster frame is positioned adjacent to the first poster frame; and hiding from display the plurality of first level classification panes displayed adjacent to the first poster frame.

9. The method of claim 1 wherein associating the keyword with the item comprises including the keyword in metadata associated with the item.

10. The method of claim 1 further comprising:

in response to receiving another input, displaying a plurality of second level classification panes adjacent to the first level classification pane on which the selected poster frame that corresponds to the item of digital content is positioned, wherein each second level classification pane is a further classification of the first level classification pane and each second level classification pane is associated with a second keyword;

detecting a positioning of the poster frame that was previously positioned at the first level classification pane, at an at least partially common location with a second level classification pane; and associating the item of digital content to which the selected poster frame corresponds with a second keyword associated with the second level classification pane on which the poster frame that corresponds to the item of digital content is positioned.

11. The method of claim 10 further comprising enabling grouping the items of digital content based on the second keyword.

12. A medium bearing instructions to enable one or more machines to perform operations, the operations comprising:

displaying one or more poster frames in a user interface, wherein a poster frame corresponds to an item of digital content;

in response to receiving an input, displaying a plurality of first level classification panes adjacent to a poster frame corresponding to an item of digital content, wherein each of the first level classification panes is associated with a corresponding keyword;

detecting a selection and positioning of the poster frame at an at least partially common location with a classification pane of the plurality of first level classification panes; and in response to the detecting, associating the item of digital content to which the selected poster frame corresponds with a keyword associated with the first level classification pane on which the selected poster frame that corresponds to the item of digital content is positioned.

13. The medium of claim 12 wherein the first level classification panes are generated based on user input.

14. The medium of claim 13 wherein a first level classification pane is generated for each associated keyword.

15. The medium of claim 14 wherein the keyword is provided by a user.

16. The medium of claim 14 wherein the keyword is automatically generated.

17. The medium of claim 12 further comprising when displaying the plurality of first level classification panes adjacent to the poster frame, darkening appearances of remaining poster frames of the plurality of poster frames.

18. The medium of claim 12 further comprising enabling grouping the items of digital content based on the keyword.

19. The medium of claim 17, the operations further comprising, subsequent to associating the item of digital content to which the selected poster frame corresponds with the keyword associated with the first level classification pane on which the selected poster frame that corresponds to the item of digital content selected is positioned, displaying the plurality of first level classification panes adjacent to a second poster frame of the plurality of poster frames, wherein the second poster frame is positioned adjacent to the first poster frame; and hiding from display the plurality of first level classification panes displayed adjacent to the first poster frame.

20. The medium of claim 12 wherein associating the keyword with the item comprises including the keyword in metadata associated with the item.

21. The medium of claim 12, the operations further comprising:

in response to receiving another input, displaying a plurality of second level classification panes adjacent to the first level classification pane on which the selected poster frame that corresponds to the item of digital content is positioned, wherein each second level classification pane is a further classification of the first level classification pane and each second level classification pane is associated with a second keyword;

detecting a positioning of the poster frame that was previously positioned at the first level classification pane, at an at least partially common location with a second level classification pane; and associating the item of digital content to which the selected poster frame corresponds with a second keyword associated with the second level classification pane on which the poster frame that corresponds to the item of digital content is positioned.

22. The medium of claim 21 further comprising enabling grouping the items of digital content based on the second keyword.

* * * * *